United States Patent [19]

Lavarini

[11] Patent Number: 4,520,486
[45] Date of Patent: May 28, 1985

[54] GAS FLOW LASER OSCILLATOR

[75] Inventor: Bernard Lavarini, Jouy en Josas, France

[73] Assignee: Compagnie General D'Electricite, Paris, France

[21] Appl. No.: 518,267

[22] Filed: Jul. 28, 1983

[30] Foreign Application Priority Data

Jul. 30, 1982 [FR] France .................. 82 13322

[51] Int. Cl.³ .................................. H01S 3/08
[52] U.S. Cl. ........................ 372/95; 372/97; 372/99
[58] Field of Search .......... 372/55, 99, 95, 97, 372/103

[56] References Cited

U.S. PATENT DOCUMENTS

| | | | |
|---|---|---|---|
| 3,889,209 | 6/1975 | Lavarini | 372/58 |
| 3,891,944 | 6/1975 | Lavarini et al. | 372/58 |
| 4,050,036 | 9/1977 | Chambers et al. | 372/95 |
| 4,164,366 | 8/1979 | Sziklas et al. | 372/95 |

OTHER PUBLICATIONS

Applied Optics vol. 19, No. 5, Mar. 1, 1980, N.Y. U.S. R. A. Chodzko et al, "Annular (HSURIA) resonators etc." pp. 778–779, 788, Apendix D.
Applied Optics vol. 17, No. 6, Mar. 15, 1978, NY U.S. pp. 936–943, P. B. Mumola et al, "Unstable resonators for annular gain volume lasers".
Applied Optics vol. 16, No. 5, May 1977, NY, U.S. pp. 1192–1196, R. J. Freiberg et al, "Split–Mode Unstable Resonator".
Proceedings of the Society of Photo-Optical Instrumentation Engineers 29–31 Jul. 1980, San Diego, California vol. 251, pp. 131–135.
R. N. Shagam et al, D. M. Swain "Centration of a Linear Cone to the Optical Axis of a Reflaxicon".

Primary Examiner—William L. Sikes
Assistant Examiner—Léon Scott, Jr.
Attorney, Agent, or Firm—Sughrue, Mion, Zinn, Macpeak & Seas

[57] ABSTRACT

Along an axis (2) of an optical cavity there are: a mirror (3) having a W-shaped cross section to give inner and outer conical reflecting surfaces (4, 6) which are oppositely inclined, a plane mirror (8) having an axial opening and facing the W-shaped mirror (3), a convex mirror (16) receiving the oscillating radiation from the W-shaped mirror (3) via the opening in the plane mirror (8), and a mirror (17) disposed between the plane mirror (8) and the convex mirror (16), said mirror (17) having an aperture and being inclined to the axis so as to extract laser energy from the oscillator.

6 Claims, 1 Drawing Figure

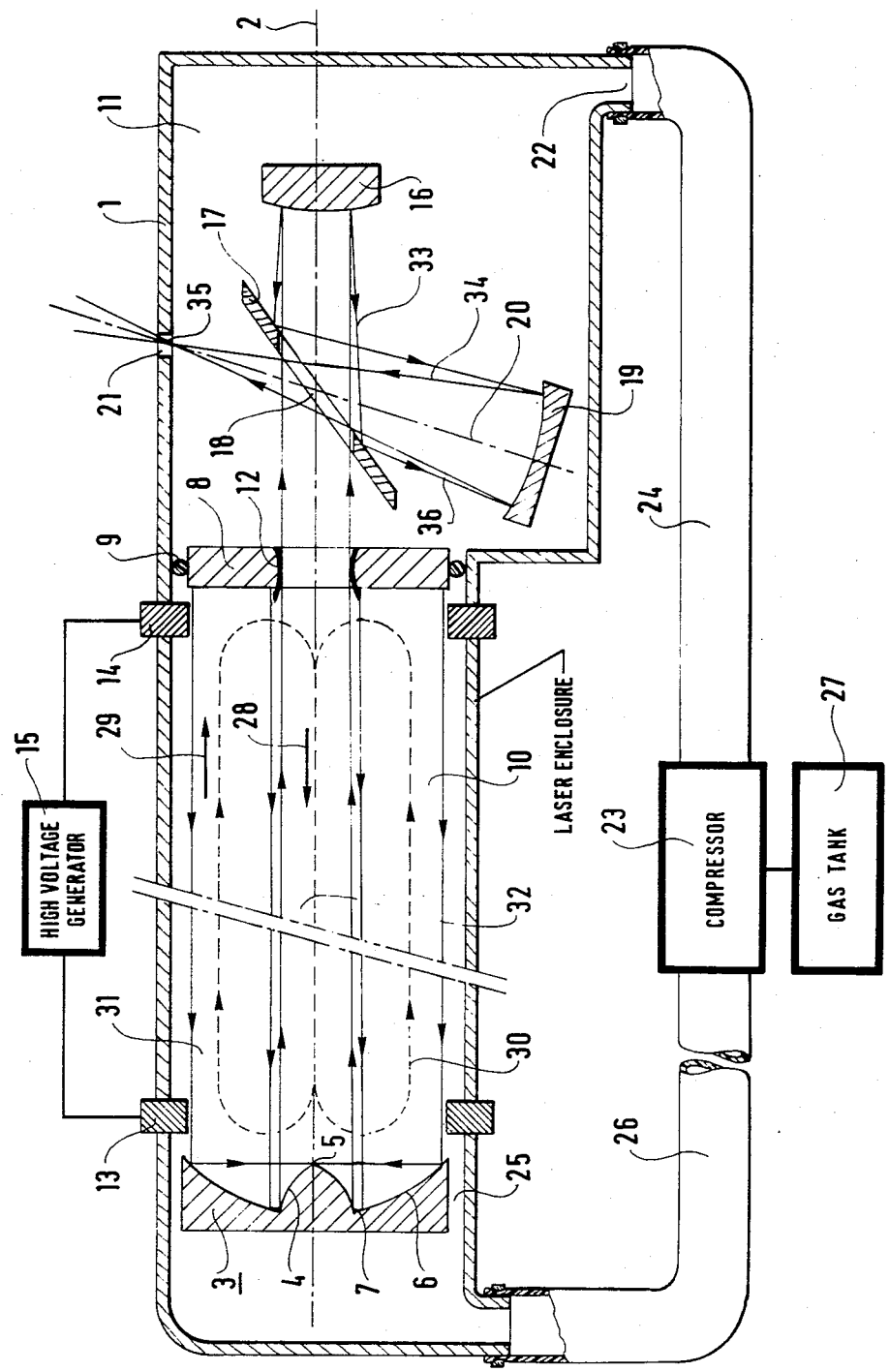

GAS FLOW LASER OSCILLATOR

The present invention relates to a gas flow laser of the type comprising:
- an elongate enclosure having an axis;
- a first reflector disposed at one end of the enclosure;
- a second reflector disposed inside the enclosure facing the first reflector, the edges of the second reflector being fixed in a sealed manner to the walls of the enclosure to form therein a first chamber between the first and the second reflectors and a second chamber between the second reflector and the other end of the enclosure, the second reflector including an opening putting the first and second chambers into communication with each other;
- means for inserting a laser active gas into the second chamber, the gas passing through the opening in the second reflector, the cross section of the opening and the pressure of the gas being chosen to form turbulant flow in the first chamber;
- means for extracting the gas from the first chamber; and
- two electrodes disposed in the first chamber and connected to a source of electric current for establishing an electric discharge in the active gas in such a manner as to create a light beam which is reflected on the first and second reflectors.

BACKGROUND OF THE INVENTION

In a known oscillator of this type, the resonant optical cavity is formed by the first and second reflectors. The output laser beam passes through the opening in the second reflector and leaves the enclosure by passing through a transparent window made in the wall of the wall of the second chamber. However, a considerable portion of an axial cylindrical zone in the first chamber of cross section corresponding to the opening in the second reflector is not occupied by the oscillating light rays, and this results in an appreciable loss of output power.

To remedy this drawback, a proposal has been made to use a multipass cavity comprising a plurality of reflectors, (eg. 14) divided into two groups. Oscillating rays are set up between these reflectors forming a zig-zag beam which passes through nearly all of the inside volume of the first chamber. However, this arrangement leads to high light losses by reflection on the numerous mirrors in the cavity, resulting in an increase in output power which is much smaller than the expected increase.

Preferred embodiments of the present invention provide an improved laser oscillator of the above-defined known type, in which the output power is increased very appreciably.

SUMMARY OF THE INVENTION

The present invention provides a gas flow laser oscillator of the above-defined type, wherein:
the first reflector comprises first and second substantially conical reflecting surfaces, said surfaces being coaxial with said axis and oppositely inclined relative to a plane normal thereto, with the first conical reflecting surface being in the center of the first reflector and being immediately surrounded by the second conical reflecting surface, the second reflector being plane and centered on said axis, said opening being axial in such a manner that an annular first beam of the light radiation coming from the second reflector is reflected in succession on said second and first conical surfaces so as to constitute a second beam about said axis which beam is cylindrical and which occupies substantially all the volume left free by the annular first beam, the second beam penetration into said second chamber via the opening in said reflector;
and wherein the oscillator further comprises:
- a convex third reflector centered on the axis, and disposed in the second chamber in such a manner as to reflect the cylindrical second beam along a divergent co-axial third beam; and
- a plane fourth reflector disposed on the axis between the second and third reflectors, said fourth reflector being provided with a central apperture and being inclined relative to a plane normal to the axis so that firstly: the second beam and an axial portion of the third beam pass through the apperture: and secondly the remaining peripheral portion of the third beam is reflected by the fourth reflector along a fourth beam;
  the first, second, third, and fourth reflectors constituting an unstable resonant cavity capable of amplifying light radiation so as to create the laser effect, the fourth beam constituting the laser radiation, and said enclosure including means for allowing the laser radiation to escape.

BRIEF DESCRIPTION OF THE DRAWING

An embodiment of the present invention is described below by way of example and with reference to the accompanying drawing in which the sole FIGURE is a diagrammatic cross section through a laser oscillator in accordance with the invention.

MORE DETAILED DESCRIPTION

In the FIGURE, there can be seen a generaly cylindrical enclosure 1 having an axis 2. Close to one end of the enclosure there is a mirror 3 of the type known as an "axicon". The central portion of this mirror is a substantially conical reflecting surface 4 having an apex 5, and the peripheral portion is a substantiallly frusto-conical reflecting surface 6. The reflecting surfaces 4 and 6 are circularly symmetrical about the axis 2, and they are joined to each other by a circle 7. They are oppositely inclined relative to a plane normal to the axis 2 so as to provide a W-shaped cross section as can be seen in the FIGURE.

A plane mirror 8 is disposed inside the enclosure 1, centered on the axis 2 and facing the mirror 3. The edges of the mirror 8 are fixed to the inside wall of the enclosure 1 by means of a sealing ring 9 so as to form a chamber 10 inside the enclosure between the mirros 3 and 8, with the remainder of the enclosure constituting a chamber 11. The mirror 8 is ring-shaped with a nozzle 12 fixed about the axis 2 around the inside cylindrical surface of the ring. The diameter of the nozzle throat is substantially equal to the diameter of the circle 7.

Two annular electrodes 13 and 14 are located inside the chamber 10 close to the mirrors 3 and 8 respectively. The two terminals of a DC source 15 of high tension are connected to respective ones of the electrodes 13 and 14.

A convex mirror 16 is disposed inside the chamber 11 and centered on the axis 2. The reflecting surface of the mirror 16 is facing the mirror 3. A mirror 17 which is inclined relative to the axis 2 and which has a central apperture 18 is disposed in between the mirrors 8 and 16. A concave mirror 19 is disposed inside the chamber 11 and is centered on a transverse axis 20 passing through the apperture 18. The wall of the enclosure surrounding the chamber 11 includes an orifice 21 disposed on the axis 20.

The chamber 11 includes an opening 22 connected to the outlet from a compressor by means of a tube 24. The chamber 10 includes openings 25 situated between the edges of the mirror 3 and the wall of the enclosure 1. The openings 25 are connected to the inlet of the compressor 23 via tubes 26. The compressor 23 is connected to a supply of gas 27.

The laser oscillator described above and shown in the FIGURE operates as follows:

The compressor 23 is put into operation to insert a mixture of gases from the supply 27 into the chamber 11. The mixture comprises carbon doixide, nitrogen, and helium. The gas enters the chamber 10 via the nozzle 12.

Preferably, gas mixture admission is adjusted in such a manner as to ensure that the pressure in the chamber 11 stabilises at a little above ambient atmospheric pressure. For example, if atmospheric pressure is 1013 millibars, the pressure in the chamber 11 should be 1028 millibars. The nozzle 12 establishes a pressure drop in the chamber 10 which is subject to aspiration from a compressor 23 via the openings 25. The pressure in the chamber 10 may settle at about 130 millibars.

The cross sectional area of the outlet openings from the chamber 10 and the throat of the nozzle 12, the pressure of the gas mixture in the chamber 11, the diameter of the chamber 10 and the distance between the reflectors 3 and 8 are all chosen in such a manner as to ensure that the gas leaving the outlet of the nozzle 12 and flowing along the axial region of the chamber 10 in the direction of an arrow 28, is displaced towards the side walls of the chamber 10 on arriving at the reflector 3 so that it then flows close to the walls of the chamber 10 in the direction of an arrow 29, thereby establishing turbulent flow 30.

The source 15 is turned on, thereby establishing a particularly stable and homogeneous electrical discharge in the active gas subjected to turbulent flow inside the chamber 10 between the electrodes 13 and 14.

The reflectors 8, 3, 16 and 17 constitute an unstable resonant optical cavity in which oscillating light radiation is established. This radiation comprises a tubular beam 31 which is reflected back along its own path by the mirror 8, then reflected susccessively by the surfaces 6 and 4 of the mirror 3 to form an axial cylindrical beam 32 parallel to the beam 31 and propagating in the opposite direction.

In practice, the generator lines of the circularly symmetrical and substantially conical reflecting surfaces 4 and 6 are not precisely straight lines, but are slightly curved in such a manner as to ensure that the beam 32 is accurately parallel to the beam 31. Practical manufacture of such non-linear profiles require the reflector 3 to be machined using a diamond-tipped tool.

Since the diameter of the nozzle 12 is substantially equal to the diameter of the circle 7 where the surfaces 4 and 6 of the mirror 3 meet each other, the beam 32 just fits through the throat of the nozzle 12 to be reflected by the mirror 16. Further, the beam 32 occupies substantially all the axial volume of the chamber 10 which is unoccupied by the tubular beam 31.

The apperture 18 through the mirror 17 is dimensioned to be a close fit around the beam 32. The convex mirror 16 reflects the beam 32 along a slightly divergent beam 33. The face of the mirror 17 facing the mirror 16 thus reflects a peripheral portion of the beam 33, which peripheral portion 36 constitutes the output laser beam. In the embodiment shown in the FIGURE, the beam 36 is returned in the opposite direction by the concave mirror 19 to form a beam 34 which passes through the apperture 18 in the mirror 17 and converges at a point 35 situated in the orifice 21 in the wall of the enclosure 1. This orifice may be about 3 mm diameter, and serves to allow the laser energy to leave the enclosure.

Since the beams 31 and 32 do not cross each other, but together occupy substantially all the useful volume of the discharge chamber 10, the energy of the output laser beam is considerably greater than the energy delivered by a known oscillator of the type defined at the beginning of this specification. Further, an unstable laser cavity in accordance with the present invention operates using a relatively small number of mirrors, thereby greatly reducing energy losses of the kind met in a multipass cavity. Angular stability in the beam delivered by an oscillator in accordance with the invention is easier to obtain that for lasers using multipass cavities. An unstable cavity enables a monomode output beam to be obtained, which is an advantage in certain applications. Finally, outputting the laser beam through an orifice in the enclosure wall avoids the reflection and absorbtion losses due to the transparent windows generally used in the prior art. This result is obtained at the price of a loss of gas which may be very low provided the gas pressure inside the enclosure in the vicinity of the orifice is very slightly greater than ambient atmospheric pressure.

A laser oscillator in accordance with the present invention may be used in an industrial laser, eg. a laser for machining.

I claim:

1. A gas flow laser oscillator comprising:
   an elongate enclosure having an axis;
   a first reflector disposed at one end of the inside of said enclosure;
   a second reflector disposed inside the enclosure facing opposite the first reflector, the edges of the second reflector being fixed in a sealed manner to the walls of the enclosure to form therein a first chamber between the first and the second reflectors and a second chamber between the second reflector and the other end of the enclosure, the second reflector including an opening putting the first and second chambers into communication with each other;
   means for inserting a laser active gas into the second chamber, the gas passing through the opening in the second reflector, the cross section of the opening and pressure of the gas being chosen to form turbulant flow in the first chamber;
   means for extracting the gas from the first chamber; and
   two electrodes disposed in the first chamber and connected to a source of electric current for establishing an electric discharge in the active gas in such a manner as to generate a coherent light beam which is reflected on the first and second reflectors;
   the improvement wherein:

the first reflector comprises first and second substantially conical reflecting surfaces, said surfaces being coaxial with said axis and oppositely inclined relative to a plane normal thereto, with the first conical reflecting surface being in the center of the first reflector and being immediately surrounded by the second conical reflecting surface, the second reflector being plane and centered on said axis, said opening being axial in such a manner that an annular first beam path of said coherent light radiation coming from the second reflector is reflected in succession on said second and first conical surfaces so as to constitute a second beam path about said axis which beam is cylindrical and which occupies substantially all the volume left free by the annular first beam path, the second beam path penetrating into said second chamber via the opening in said second reflector;

and wherein the oscillator further comprises:

a convex third reflector centered on the axis, and disposed in the second chamber in such a manner as to reflect the cylindrical second beam path along a divergent co-axial third beam path; and a plane fourth reflector disposed on the axis between the second and third reflectors, said fourth reflector being provided with a central apperture and being inclined relative to a plane normal to the axis so that firstly; the second bearing path and an axial portion of the third beam path passes through the apperture; and secondly the remaining peripheral portion of the third beam path is reflected by the fouth reflector along a fourth beam path;

the first, second, third, and fourth reflectors constituting an unstable resonant cavity capable of amplifying coherent light radiation, a concave fifth reflector disposed to concentrate the energy of the laser radiation along a fifth beam path to a point on said enclosure means such that the laser radiation escapes.

2. An oscillator according to claim 1, wherein said means for allowing the laser radiation to escape comprise an orifice through the wall of the enclosure surrounding the second chamber, the point at which the laser energy is concentrated being disposed in said orifice, said means for inserting the active gas into the second chamber being capable of maintaining said chamber at an active gas pressure which is slightly above the gas pressure outside the enclosure in the vicinity of said orifice.

3. An oscillator according to claim 1, wherein the fifth reflector is disposed in such a manner that the fifth beam path passes through the apperture through the fourth reflector, said fourth reflector being situated between the fifth reflector and the concentration point.

4. An oscillator according to claim 1, including a nozzle passing through the second reflector to create reduced gas pressure in the first chamber, said axial opening being constituted by the throat of the nozzle.

5. An oscillator according to claim 1, wherein said means for inserting active gas into the second chamber and for removing it from the first chamber comprise a compressor having an inlet connected to the first chamber and an outlet connected to the second chamber.

6. An oscillator according to claim 1, wherein the laser active gas is a mixture of nitrogen, carbon dioxide and helium.

* * * * *